United States Patent [19]

Mays

[11] Patent Number: 5,947,659
[45] Date of Patent: Sep. 7, 1999

[54] DRILL BIT

[76] Inventor: Ralph C. Mays, 5436 S. Mingo Rd., Tulsa, Okla. 74146

[21] Appl. No.: 09/011,103
[22] PCT Filed: Jul. 19, 1996
[86] PCT No.: PCT/US96/12002
§ 371 Date: Jan. 22, 1998
§ 102(e) Date: Jan. 22, 1998
[87] PCT Pub. No.: WO97/04908
PCT Pub. Date: Feb. 13, 1997

Related U.S. Application Data

[60] Provisional application No. 60/001,569, Jul. 27, 1995.

[51] Int. Cl.$^6$ ........................................... B23B 51/02
[52] U.S. Cl. .......................... 408/211; 408/223; 408/230
[58] Field of Search ................... 408/211, 223, 408/224, 227, 230; 433/165

[56] References Cited

U.S. PATENT DOCUMENTS

| | | |
|---|---|---|
| 2,396,335 | 7/1946 | Moller . |
| 2,576,664 | 12/1951 | Berlien . |
| 4,594,034 | 6/1986 | Maier . |
| 5,046,902 | 9/1991 | Zubov . |
| 5,380,133 | 1/1995 | Schimmer ............................ 408/230 |

FOREIGN PATENT DOCUMENTS

| | | |
|---|---|---|
| 0211106 | 12/1985 | European Pat. Off. . |
| 1216707 | 8/1989 | Japan . |
| 485871 | 1/1976 | U.S.S.R. . |
| 454916 | 10/1936 | United Kingdom . |
| WO 95/04624 | 2/1995 | WIPO . |

*Primary Examiner*—Daniel W. Howell
*Attorney, Agent, or Firm*—Head, Johnson & Kachigian

[57] ABSTRACT

A high speed drill bit is formed of a longitudinal body designed to rotate about a longitudinal axis. Each flute has a leading edge with a positive rake angle and a trailing edge with a neutral or negative rake angle. The bit cutting face is formed by surfaces and cutting edges that are asymmetrical with respect to each other.

4 Claims, 2 Drawing Sheets

DRILL BIT

CROSS-REFERENCE TO RELATED APPLICATIONS

This application is based on Provisional Application No. 60/001,569 entitled "DRILL BIT" filed Jul. 27, 1995.

CROSS-REFERENCE TO MICROFICHE APPENDIX

This application is not related to any microfiche appendix.

BACKGROUND OF THE INVENTION

Drill bits are well known in the prior art and are used for drilling nearly any material that commonly exists. Drill bits include bits for drilling wood, steel, plastic, concrete, tile, bone, teeth and so forth. The typical drill bit is frequently referred to as a "twist drill" and is formed of an elongated metal generally cylindrical member having a cutting tip at one end and a shank end at the other. A shank end is thinned by which the bit is grasped by a drill or other device for rotating the bit.

The typical drill bit, and particularly the typical twist drill, has spiral flutes on the exterior surface. The most common type of twist drill has two spiral flutes and a cutting tip with two cutting edges. The spiral flutes are typically symmetrical with respect to a cross-section of the longitudinal or rotational axis of the drill bit and the spiral flutes are typically essentially identical to each other. The cutting tip of the typical drill bit has two spiral flutes that has two cutting edges, each cutting edge extending for a length that is approximately the radius of the basic cylindrical configuration of the bit. Therefore, the two cutting surfaces combined provide an area of contact approximately equal to the diameter of the cylindrical area of the bit. This rather long total cutting edge contact means that, in order to achieve a rapid drilling rate, the bit usually is required to be forced into contact with the material being drilled. Further, the relatively large area of contact of the cutting edge or cutting edges of the drill bit tend to create excessive heat in the drilling operation.

The drill bit of the present disclosure is intended to provide a cutting tip having a non-symmetrical cutting surface with cutting edges that are reduced in length compared to that of the typical twist drill so that thereby force applied on the bit during the drilling operation is concentrated in a shorter tip contact length compared to the typical twist drill.

SUMMARY OF THE INVENTION

The subject of this disclosure is an improved drill bit of the type to be utilized in an instrument providing rotational energy. The drill bit is adaptable for drilling in any material in which a drill bit is normally employed, including metal, wood, and plastics. The drill bit described herein is particularly applicable for use in a tool providing a relatively high rotational rate, that is, a high rpm.

The use of drill bits is, of course, well known. However, the drill bit of this invention is different than the standard drill bit commonly available on the market today. The standard drill bit has a drilling tip that is symmetrical. That is, a standard drill bit has two spiral flutes that end at the drilling tip in which the drilling tip is tapered, providing two opposed cutting surfaces. The cutting surfaces meet at the rotational axis of the drill bit to define a point of rotation around which the drilling surface rotates. The present invention is different in that the drilling tip is asymmetrical and employs asymmetrical cutting edges.

A search for prior art relative to the present disclosure uncovered the following United States patents which will be incorporated by reference to provide background information as to drill bits and particularly to drill bits having a symmetrical cuffing faces.

| PATENT NO. | INVENTOR | TT3 |
|---|---|---|
| Design 332,492 | Rosenberg | Bone Drill Bit For Bone Fasteners |
| Design 347,848 | Maynard, Jr. | Drill Bit |
| 4,345,899 | Vlock | Dental Twist Drill |
| 4,456,411 | Clement | Twist Drill |
| 4,813,824 | Grunsky | Single-Lip Drilling Tool |
| 4,943,236 | Linkow et al | Asymmetrical Bone Drill |

DESCRIPTION OF THE DRAWINGS

FIG. 2 shows the body of the bit having two opposed spiral flutes. The common means of manufacturing a drill bit of the type in use today has a body with opposed spiral flutes but wherein the spiral flutes are semi-circular in cross-sectional configuration. FIG. 2 shows that in practicing the present invention, the spiral flutes are preferably not semi-circular in cross-sectional configuration but, instead, provide leading edges and trailing edges with positive and negative rake angles respectively.

FIG. 4 shows the hole as initially formed at the beginning of a drilling operation.

FIG. 5 shows the bit rotated 180° compared to FIG. 4.

DETAILED DESCRIPTION OF THE PREFERRED EMBODIMENTS

Figure 1:
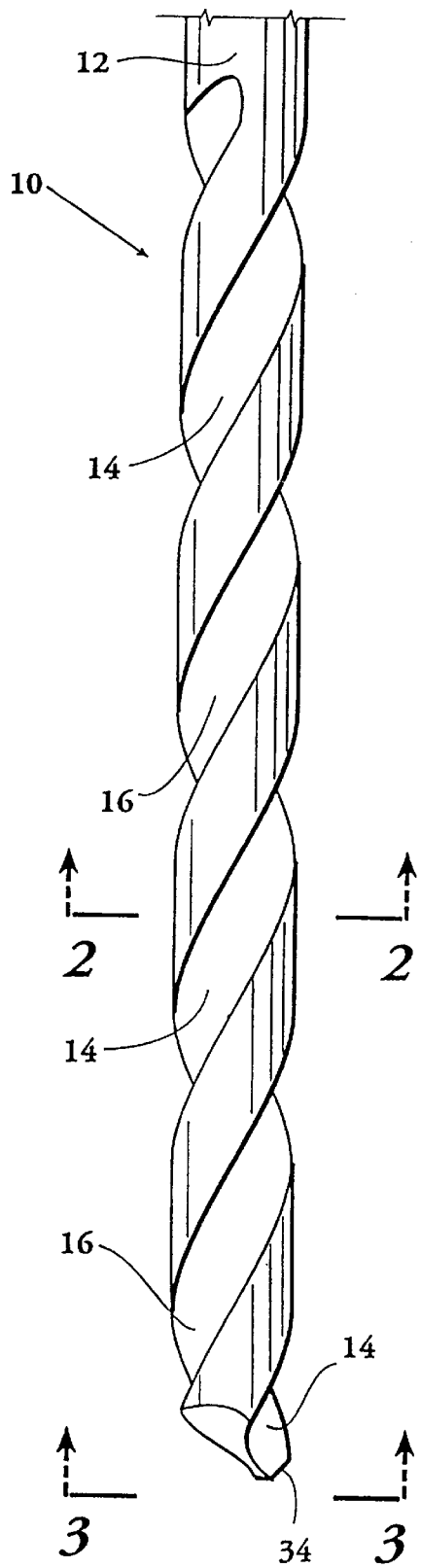
FIG. 1 is an elevational view of a bit employing the principles of this disclosure. The bit of FIG. 1 has two concentric spiral flutes terminating in a bit face that may be termed a "drilling face". The drilling face is configured to form cutting edges.
Figure 2:
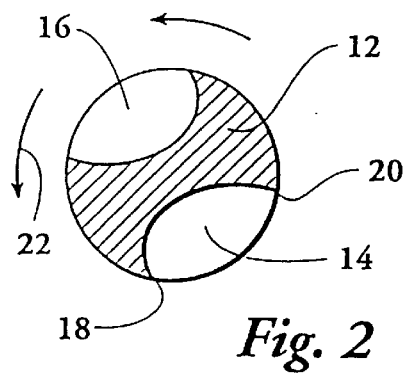
FIG. 2 is a cross-sectional view taken along the line 2—2 of FIG. 1.
Figure 3:
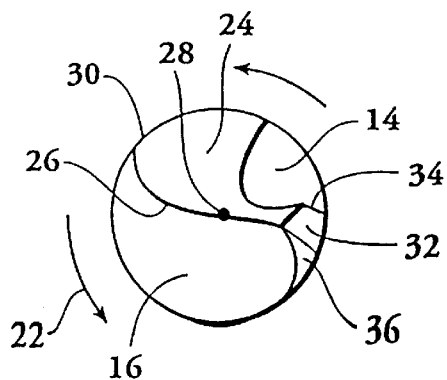
FIG. 3 is a slightly enlarged end view of the drill bit of FIG. 1 showing the non-symmetrical configuration of the drill bit and showing the cutting surfaces formed thereon.

Referring first to FIGS. 1, 2 and 3, the basic concepts of the improved drill bit are shown. FIG. 1 illustrates an elevational view of a bit having a shank portion 12, a first flute 14, and a second flute 16. Flutes 14 and 16 intertwine and are concentric with respect to each other. The use of two opposed helical flutes is common in the manufacture of drill bits. While flutes 14 and 16 may be semi-circular in cross-sectional configuration, in the preferred arrangement of bit 10 of this disclosure, flutes 14 and 16 are not semi-circular. As shown in FIG. 2, flute 14 provides a shape of body 12 so that first edge 18 has a positive rake angle and a second edge 20 that has a neutral rake angle. That is, if a tangent is drawn to the circle formed by the rotating drill bit body at point 18, the shape of the flute at such point forms an acute angle to the tangent, that is, a rake angle that would tend to cut into any surface engaged by the rotating bit, thus the edge is said to have a positive rake angle. On the other hand, at the other end of flute 14, at point 20, the flute provides, with respect to a tangent drawn through point 20, a rake angle that is neutral, that is, the flute surface engages point 20 approximately perpendicular to a tangent drawn through the point 20. The shape of flute 14 could also be such that at point 20 a negative rake angle is achieved, that is, where the flute surface intersects a tangent at an obtuse angle that would tend to slide against any surface engaged by the rotating bit.

Flute 16 is configured like flute 14 wherein one of the flute edges provides a positive rake angle and the other flute angle provides a neutral rake angle.

FIG. 3 is an end view of bit 10 as taken along the line 3—3 of FIG. 1. The direction of rotation of the bit is clockwise as is common with most bits commercially available today. However, in looking at an end view of a bit intended to be rotated clockwise, the direction of rotation is counterclockwise as indicated by the arrows 22. FIG. 3 shows flutes 14 and 16. A cutting face is defined by a first surface 24 having a cutting edge 26. The center of rotation of the cutting face of FIG. 3 is indicated by the numeral 28. Cutting edge 26 extends from the bit peripheral surface 30 to the area where the forward edge of first surface 26 is adjacent to the center of rotation 28.

The drill bit face of FIG. 3 is further defined by a second surface 32 terminating in a second cutting edge 34. The intersection of second surface 32 with second cutting edge 34 provides a positive rake angle at the cutting edge. The following portion of second surface 32, indicated by the numeral 36, is rounded off to provide a non-contacting surface. In one embodiment, surfaces 32 and 36 can be in a common plane.

Figure 4:
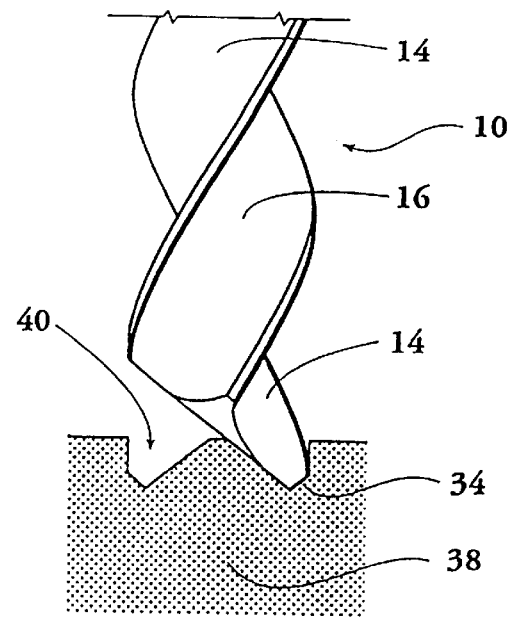
FIG. 4 is a fragmentary elevational enlarged cross-sectional view showing a bit of this invention as used to form a hole in an object.

FIG. 4 shows the bit of FIGS. 1–3 as it penetrates a work piece 38. The work piece 38 can be metal, plastic, wood or so forth. It can be seen from FIG. 3 that the configuration of the hole 40 is formed by bit 10 and is completely different than that formed by the usual drill bit which is downwardly tapered. Instead, with the bit of this disclosure the bottom of the hole provides a peak.

With the bit of FIGS. 1–3, primary cutting action takes place by means of a second cutting edge 34 which cuts the periphery of the hole, with the interior of the hole being cut primarily by first cutting edge 26. An important aspect of the bit of this disclosure is the fact that improved boring efficiency is obtained with a bit that cuts the hole from the periphery inwardly.

The efficiency of the drill bit 100, as shown in FIGS. 1–3, is improved due to the characteristic of drilling a hole where first and deepest penetration of the bit in a work piece is at the drill hole periphery. Most of the material that must be removed to drill a circular cross-section hole is adjacent the periphery of the hole. Thus, the edge 34, although relatively short in length, effectively removes a significant portion of the material that must be removed to form a hole 40 in work piece 38.

Figure 6:
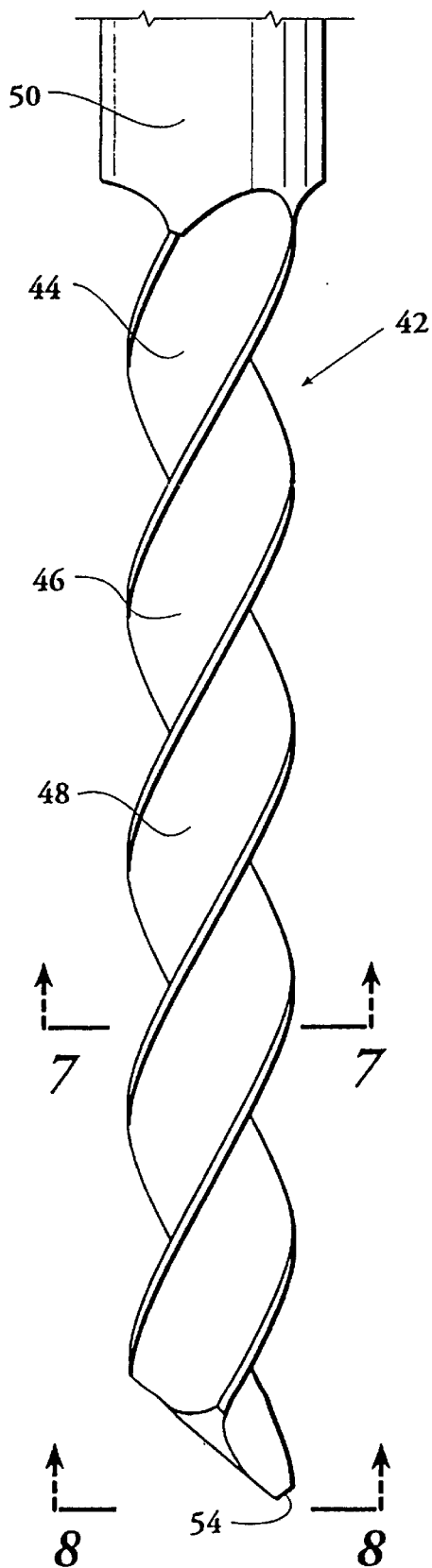
FIG. 6 is an elevational view of an alternate embodiment of the invention. The bit of FIG. 6 has three concentric spirals. Further, the bit of FIG. 6 has a drilling portion that is of reduced diameter compared to the bit shank portion.
Figure 5:
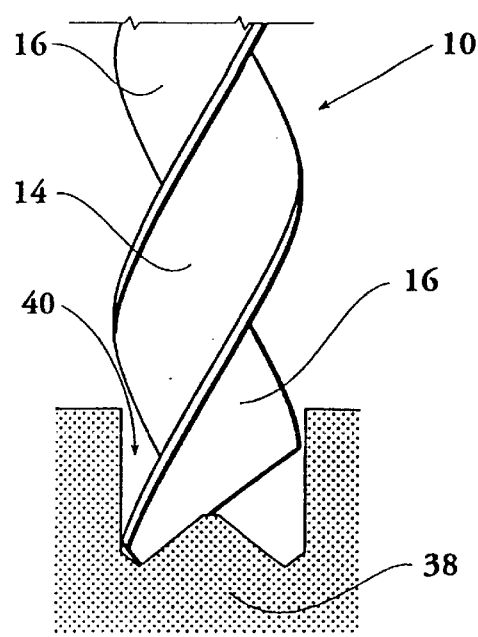
FIG. 5 is an elevational enlarged cross-sectional view as shown in FIG. 4 but showing the bit as it has further advanced in the process of drilling a hole in an object.
Figure 7:
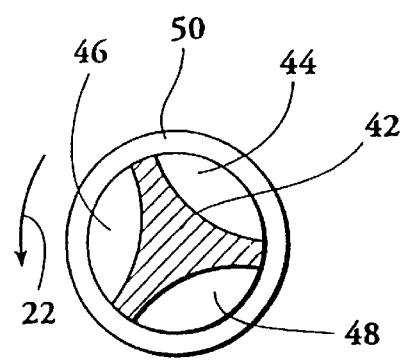
FIG. 7 is a cross-sectional view as taken along the line 7—7 of FIG. 6 showing the body of the drill bit in cross-section and showing three symmetrical flutes in an arrangement in which the flutes are semi-circular.
Figure 8:
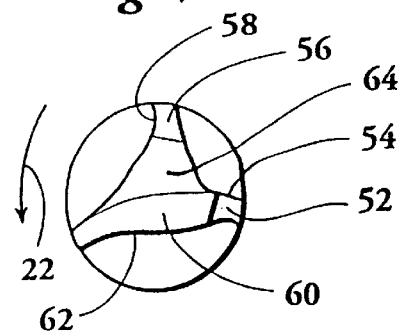
FIG. 8 is an end view of the bit of FIG. 6 showing the cutting edges formed on the bit.

FIGS. 6, 7 and 8 show an alternate embodiment of the invention wherein the bit body 42 has three flutes 44, 46 and 48. The flutes are concentric with each other. In the embodiment of FIG. 6, the drilling portion is of reduced diameter compared to the shank portion 50, however, this is for illustration purposes only as the design and operation of the bit is the same whether or not the shank 50 is the same external diameter as the bit body 42.

As shown in FIG. 7, flutes 44, 46 and 48 are semi-circular in configuration, as contrasted with the flutes of the embodiment of FIGS. 2 and 3. However, it is understood that a bit employing the principles of this disclosure can have three flutes with the flute configuration as shown in FIGS. 2 and 3.

FIG. 8 shows the bit cutting face as formed by four surfaces. The first surface 52 terminates in a first cutting edge 54. It can be seen that the cutting edge 54 is at the outer perimeter of the bit body and achieves the advantages previously described for cutting edge 34 of FIG. 3. First surface 52 slants to provide a positive rake angle for the cutting edge 54.

A second surface 56 terminates in a second cutting edge 58. Surface 56 slants so that cutting edge 58 has a positive rake angle.

A third surface 60 has a third edge 62. A fourth surface 64 interconnects surfaces 52, 56 and 60. The embodiment of FIGS. 6 through 8 provides two cutting surfaces. In the embodiment of the three flute version of the drill bit as illustrated in FIGS. 6, 7 and 8, the end surfaces of the drill bit face function to guide the drill bit to hold roundness and to insure that the size of the drilled hole is that defined by the bit diameter.

The bit of this disclosure is preferably practiced in a way wherein the bit can operate at a high rpm. The reason that a high rpm is preferred is that in many applications it is not practical to support the bit around a fixed axis of rotation and support the work piece inmoveable relative to the bit fixed axis of rotation. Cutting edge 34 (FIG. 3) first engages the work as bit 10 is advanced towards work piece 38. With bit 10 rotated at a high rpm, the cutting action of surface 34 will quickly form an annular cut in the surface of the work piece, and after the annular cut is initially formed the bit no longer requires a center point of rotation as it then centers itself within the circumferential initial cut formed by the bit cutting edges positioned adjacent the bit peripheral surface.

While not limited to a specific application, the bit of this invention is particularly applicable for use in drilling non-metallic work pieces. A good example of the application of this bit is in dentistry wherein the bit can be operated in a handpiece as used by dentists who typically operate bits at high rpm where drilling is into a tooth. Another example of the application of this invention is drilling holes in plastic and fiber based circuit boards as used in the electronic industry.

The bit of this disclosure is particularly adaptable for drilling in live bone, such as when used by a dentist to drill a hole in a jaw bone for mounting a dental post. The drill disclosed has the advantage, when compared to a standard drill design as commonly available on the market today, of producing less heat as a hole is drilled. Heat is particularly harmful when drilling in live bone since excessive heat can destroy tissue surrounding the bone. The drill of this disclosure produces less heat since, unlike the standard drill bit, it does not cut from a hole from the center outwardly, but cuts primarily from the hole perimeter inwardly.

The fact that the drill of this disclosure results in less heat is beneficial in other applications since excessive heat build up is a major factor limiting bit life.

While exhaustive tests have not been completed, initial tests indicate that the bit of this disclosure is expected to provide an improved rate of penetration compared to the standard bit commonly available today that utilizes a center point of rotation.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A drill bit having a longitudinal body having a rotational axis, with a cutting tip at one end and an opposite shank end, wherein said body has at least one asymmetrical spiral flute formed on the exterior surface thereof, the spiral flute extending from said cutting tip towards said shank end, the spiral flute defined in a cross-section perpendicular to said rotational axis by a leading edge having a positive rake angle and a trailing edge having a negative rake angle, and at said cutting tip, a cutting edge that is asymmetrical with respect to said bit body rotational axis.

2. A drill bit according to claim 1 wherein said body has a plurality of asymmetrical spaced apart spiral flutes formed on the exterior surface thereof, each of the spiral flutes extending from said cutting tip towards said shank end, each said spiral flute being defined in a cross-section perpendicular to said rotational axis by a leading edge having a positive rake angle and a trailing edge having a negative rake angle, and at said cutting tip, a plurality of cutting edges that are asymmetrical with respect to said bit body rotational axis.

3. A drill bit according to claim 2 having, at said cutting tip, first and second cutting surfaces that are asymmetrical with respect to each other, the cutting surfaces intersecting each other forming a line of intersection that is asymmetrical with respect to said bit rotational axis.

4. A drill bit according to claim 2 wherein said cutting tip is defined by a plurality of planar cutting surfaces that are each asymmetrical with respect to the other, said cutting surfaces intersecting to form a plurality of cutting edges, each cutting edge being asymmetrical with respect to each other cutting edge.

* * * * *